United States Patent
Chiang

(10) Patent No.: US 6,289,206 B1
(45) Date of Patent: Sep. 11, 2001

(54) COMPUTER PERIPHERAL RADIO RECEIVER

(75) Inventor: Arno C. H. Chiang, Taipei (TW)

(73) Assignee: AllSpirit Co., Ltd., Taipei Shien (TW)

( * ) Notice: Subject to any disclaimer, the term of this patent is extended or adjusted under 35 U.S.C. 154(b) by 0 days.

(21) Appl. No.: 09/144,685

(22) Filed: Aug. 31, 1998

(51) Int. Cl.$^7$ .................................................. H04B 17/02
(52) U.S. Cl. ...................... 455/130; 455/205; 455/313; 455/351; 455/334; 455/557
(58) Field of Search ..................... 455/550, 556, 455/557, 558, 559, 575, 90, 205, 313, 344, 351, 334, 130, 131, 280

(56) References Cited

U.S. PATENT DOCUMENTS 5,790,958 * 8/1998 McCoy et al. ...................... 455/557
6,038,431 * 3/2000 Fukutani et al. ...................... 455/90

* cited by examiner

Primary Examiner—Doris H. To
(74) Attorney, Agent, or Firm—Dougherty & Troxell

(57) ABSTRACT

Disclosed is a computer peripheral radio receiver joined in the computer peripheral input equipment such as mouse, key board and hand writing board. The radio receiver is composed of a micro controller for associating sound receiving and processing a FM phase-lock loop circuit, an oscillator, a FM integrated circuit, and an input displacement detector. The sound receiving circuit associated with an antenna and cables for transmitting audio and communication signals, is then connected to the computer peripheral input equipment with the cables thereby accomplishing two way communication with the computer at a specified regulation using a soft ware driving program.

1 Claim, 2 Drawing Sheets

COMPUTER PERIPHERAL RADIO RECEIVER

BACKGROUND OF THE INVENTION

1. Field of the Invention

The present invention relates to a computer peripheral radio receiver, and more particularly to a computer input peripheral having a radio receiver scheme for displaying the radio functions on the computer by operating the computer input peripherals.

2. Brief Description of the Prior Art

The most important and in most common use computer input peripherals are the mouse, the key board and the hand writing board in which the purpose of use of the peripherals may be attained merely by operating their functional equipment. It is well understood that an ordinary computer is capable of calculating, listing, vocal announcing, displaying pictures, facsimiling and interconnecting in a network, but there is no radio function which is quite unsatisfactory to users. How wonderful it would be for a computer operator to relax himself (or herself) if the computer he (she) is working with, could play back ground music by combining two devices into one similar ports at the same time.

To achieve this object, the inventor of the present invention developed a computer radio receiver and applied for a utility model patent to Taiwan ROC by STET application No. 85203652 in 1996. In this model the radio receiver is connected to the interfaces of a personal computer (for example series port or parallel port), and its audio frequency output plug is inserted to the outlets of MIC IN or LINE IN of the sound blaster of the computer so that the soft ware driving program executed by the personal computer may control the radio receiver thereby recording the content of broadcast in the hard disc driver (HDD)of the personal computer via its sound blaster so as to perform the functions of receiving, recording and playing back with a signal computer.

However, this utility model "computer radio receiver" has the following drawbacks; first, since it is connected to the interface of a personal computer, the assembly work is somewhat complicated and difficult. Second, the personal computer is thereinafter asked to perform mass media functions, such as receiving, recording and playing back, so that its efficiency of normal functions may be affected or even causes computer failure by overloading it too much. Third, as the radio receiver is connected to the computer, communications of other peripherals connected to similar ports may be interfered with and the response will be delayed. Finally, such mode of installation by connecting the radio receiver to a personal computer not only makes the entire apparatus too complicated, but also increases its production cost.

SUMMARY OF THE INVENTION

For solving the shortcoming of the previously developed computer peripheral radio receiver, the inventor of the present invention has made further efforts to modify his previous invention and finally comes out with an innovated new scheme for a computer peripheral radio receiver which is now to be disclosed hereinafter.

It is an object of the present invention to provide a computer peripheral radio receiver with a scheme which is easy for assembling and reliable without worry of computer failure.

It is another object of the present invention to provide a computer peripheral radio receiver with a scheme which can be cooperatively used with other peripheral equipment without conflict with each other.

It is one more object of the present invention to provide a computer peripheral radio receiver with a simple and neat scheme and a low production cost as well.

To achieve these and other objects, according to the present invention, a sound receiving circuit is joined with the computer peripheral input driving equipment which simplifies and facilitates connecting the sound receiving circuit to the personal computer reliably without failure. Furthermore, by enhancing the regulating ability of the computer peripheral equipments and providing a micro processor, which in addition to data processing function, with ability to cooperate with the behavior of other computer peripheral equipment.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
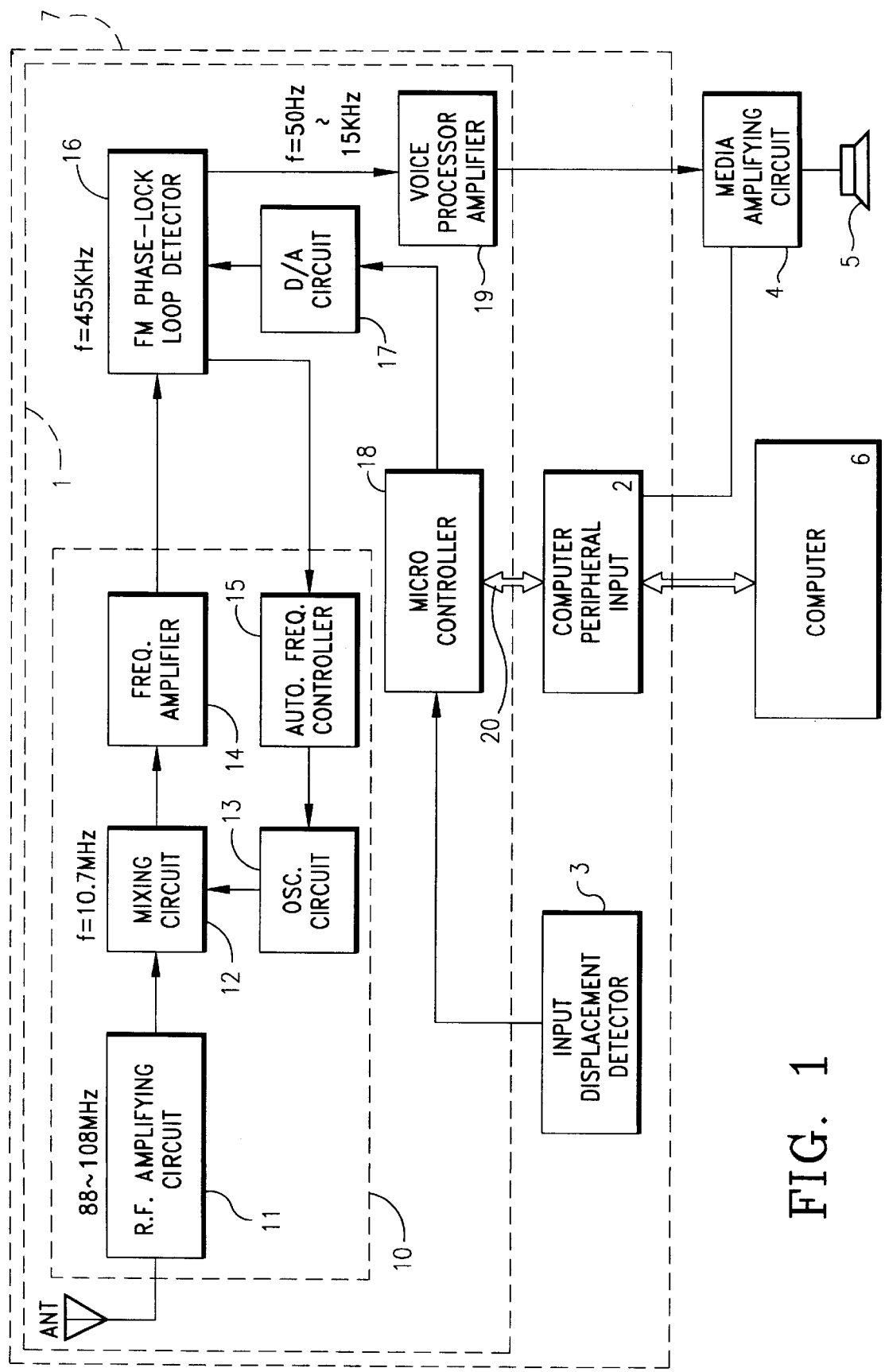
FIG. 1 is a block diagram showing the layout of the components in an embodiment of the present invention.
Figure 2A:
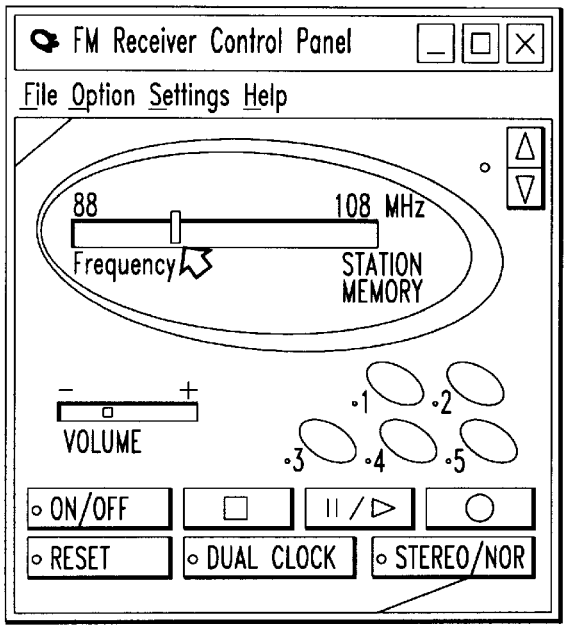
FIG. 2A through FIG. 2D are the drawings showing different display states by the computer monitor in an embodiment of the present invention.
Figure 2B:
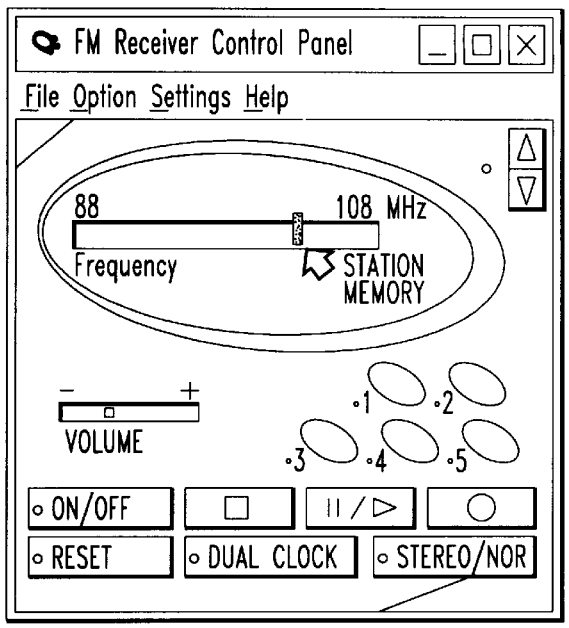
Figure 2C:
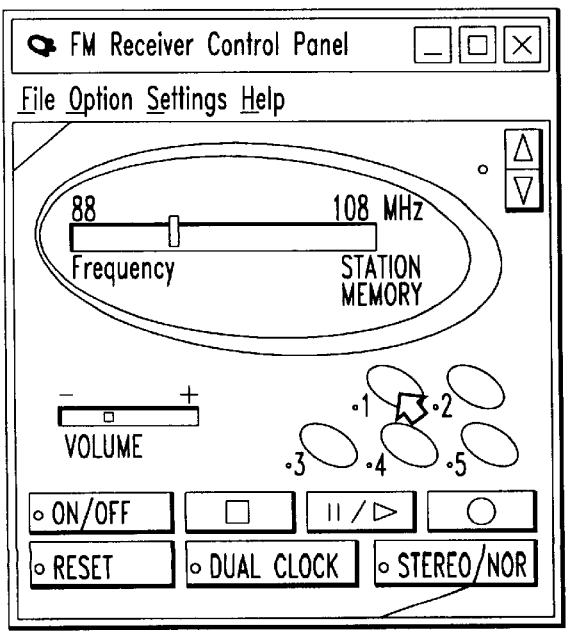
Figure 2D:
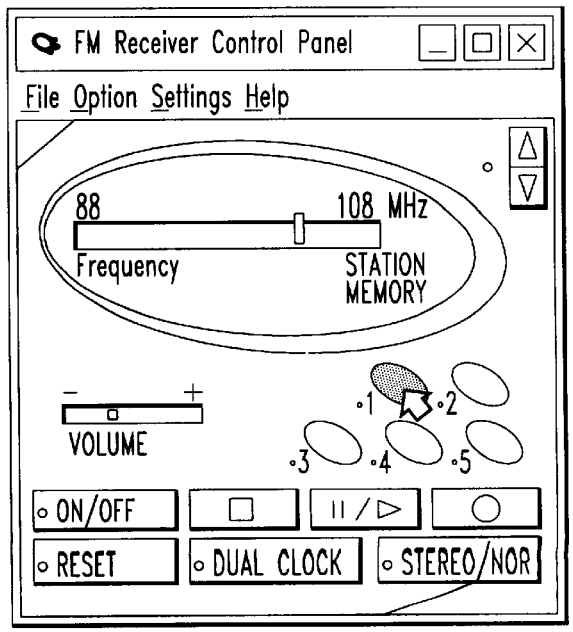

Referring to FIG. 1, a block diagram showing the layout of the components in an embodiment of the present invention, it is clearly shown in the drawing that the computer peripheral radio receiver of the present invention comprises a sound receiving circuit 1, a computer peripheral input equipment 2, an input displacement detector 3 (for example: mouse, hand writing board, keyboard, etc.), a mass media amplifying circuit 4, and a speaker 5, wherein the sound receiving circuit 1 is associated with an antenna and cables for transmitting audio and communication signals, and is then connected to the computer peripheral input equipment 2 with cables 20 thereby accomplishing two way communication with the computer using a soft ware driving program.

Referring again to FIG. 1, in which the sound receiving circuit 1 is composed of a radio frequency amplifying circuit 11, a mixing circuit 112, a local oscillating circuit 13, an intermediate frequency amplifier 14, an automatic frequency controller 15, a FM phase-lock loop detector 16, a D/A circuit 17, a micro controller 18, and a voice processor amplifier 19, the sound receiving circuit 1 is connected to the original computer peripheral input equipment 2 to form a new computer peripheral input equipment 7.

The radio frequency amplifying circuit 11, the mixing circuit 12, the local oscillating circuit 13, the intermediate frequency amplifier 14 and the automatic frequency controller 15 are combined to form the frequency modulation integrated circuit (FMIC) 10.

The micro controller 18 is part of the sound receiving circuit 1 which is connected to the computer peripheral input equipment 2 described above, by receiving the instruction of the personal computer 6, the micro controller 18 controls the frequency of the FMIC 10, and responses to the personal computer for displaying the state through the system soft ware.

The FM phase-lock loop detector 16 is also used to control the frequency of the FMIC 10 so as to stabilize the signal received.

In the FMIC 10 the radio signals received by the antenna are amplified by the radio frequency amplifying circuit 11 to produce intermediate frequency signals in the mixing circuit 12, and then the intermediate frequency signals are further amplified by the intermediate frequency amplifier 14 and finally demodulated by the D/A circuit 17.

The input displacement detector 3 is used to analyze the times of operation of displacement concerning the computer peripheral input equipment 2 including key displacement, mouse displacement and hand writing displacement etc., and to send the results to the micro controller 18 for communication with the personal computer 6. Accordingly, the pictures as shown in FIG. 2A through 2D may be displayed on the screen of the computer's monitor. The information as to frequency, sound volume, station, on/off state of the source switch, and timing counter are clearly displayed.

As for voice treatment, the digital signals obtained after demodulation by the D/A circuit may be connected to MIC IN, LINE IN or DATA IN sound blaster terminals of the personal computer 6 by way of an audio frequency output plug.

Accordingly, as described above, a sound receiving circuit is advantageously joined with the computer peripheral input equipment for better control and easier assembly, the computer peripheral radio receiver of the present invention exhibits far effective functions than those made by conventional techniques.

The invention may be embodied in other specific forms without departing from the sprit of essential characteristics thereof. The present embodiment is therefore to be considered in all respects as illustrative and restrictive, the scope of the invention being indicated by the appending claims rather than by the foregoing description and all changes which come within the meaning and range of equivalency of the claims are therefore intended to be embraced therein.

What is claimed is:

1. A computer peripheral radio receiver for a personal computer having a peripheral equipment input and a media amplifying circuit connected to a speaker, and comprising:

a) a frequency modulation integrated circuit having a radio frequency circuit connected to an antenna for receiving radio signals, a mixing circuit connected to the radio frequency circuit, a frequency amplifier connected to the mixing circuit, an oscillating circuit connected to the mixing circuit, and an automatic frequency controller connected to the oscillating circuit;

b) an FM phase lock loop detector connected to the frequency amplifier and to the automatic frequency controller;

c) a micro controller connected to the FM phase lock loop detector through a D/A circuit, the micro controller adapted to be connected to the peripheral equipment input of the personal computer; and, d) a voice processor amplifier connected to the FM phase lock loop detector and to the media amplifying circuit.

\* \* \* \* \*